United States Patent
Englund et al.

(10) Patent No.: US 11,332,270 B2
(45) Date of Patent: May 17, 2022

(54) BINDING MACHINE AND METHOD FOR SECURING A PART OF A BINDING ELEMENT IN A LOOP AROUND ONE OR MORE OBJECTS

(71) Applicant: SUND BIRSTA AB, Sundsvall (SE)

(72) Inventors: Ove Englund, Stockholm (SE); Peter Märstedt, Stockholm (SE); Erik Danielsson, Sundsvall (SE)

(73) Assignee: Sund Birsta AB, Sundsvall (SE)

(*) Notice: Subject to any disclaimer, the term of this patent is extended or adjusted under 35 U.S.C. 154(b) by 769 days.

(21) Appl. No.: 16/073,525

(22) PCT Filed: Jan. 26, 2017

(86) PCT No.: PCT/EP2017/051643
§ 371 (c)(1),
(2) Date: Jul. 27, 2018

(87) PCT Pub. No.: WO2017/129679
PCT Pub. Date: Aug. 3, 2017

(65) Prior Publication Data
US 2021/0206523 A1  Jul. 8, 2021

(30) Foreign Application Priority Data
Jan. 29, 2016 (SE) .................. 1650114-0

(51) Int. Cl.
*B65B 13/32* (2006.01)
*B29C 65/16* (2006.01)
(Continued)

(52) U.S. Cl.
CPC .............. *B65B 13/32* (2013.01); *B29C 65/16* (2013.01); *B29C 65/562* (2013.01);
(Continued)

(58) Field of Classification Search
CPC ... B29C 66/1142; B29C 65/562; B29C 65/16; B29C 66/4324; B29C 66/49;
(Continued)

(56) References Cited

U.S. PATENT DOCUMENTS 3,759,169 A * 9/1973 Goodley ................. B65B 13/06
100/29
3,863,557 A * 2/1975 Takahashi ............... B65B 13/32
100/33 PB
(Continued)

FOREIGN PATENT DOCUMENTS

| EP | 1090708 A2 | 4/2001 |
|---|---|---|
| EP | 2868585 A1 | 5/2015 |

*Primary Examiner* — Vishal I Patel
(74) *Attorney, Agent, or Firm* — Dilworth & Barrese, LLP

(57) ABSTRACT

A binding machine comprising: —a feeding device for feeding a binding element (3) in the form of a wire or strap in a loop around one or more objects to be bound and subsequently retracting the binding element to draw it tightly around said objects; and—a laser welding device for forming a welded joint between a section at the leading end of the binding element and an adjoining section at the trailing end of the part (3a) of the binding element fed in a loop around said objects to thereby secure this part of the binding element in a loop around the objects. The laser welding device is configured to cut off the binding element at said trailing end to thereby release said part (3a) of the binding element from the remaining part (3b) of the binding element.

16 Claims, 7 Drawing Sheets

(51) Int. Cl.
| | |
|---|---|
| *B29C 65/56* | (2006.01) |
| *B29C 65/74* | (2006.01) |
| *B29C 65/78* | (2006.01) |
| *B29C 65/00* | (2006.01) |
| *B65B 13/06* | (2006.01) |
| *B65B 61/06* | (2006.01) |

(52) U.S. Cl.
CPC ...... *B29C 65/7473* (2013.01); *B29C 65/7841* (2013.01); *B29C 66/1122* (2013.01); *B29C 66/1142* (2013.01); *B29C 66/4324* (2013.01); *B65B 13/06* (2013.01); *B65B 61/06* (2013.01)

(58) Field of Classification Search
CPC ............ B29C 65/7841; B29C 65/7473; B29C 66/4322; B29C 66/1122; B29C 66/69; B65B 61/06; B65B 13/32; B65B 13/06; B65B 51/22; B29L 2031/7276; B29L 2007/007

See application file for complete search history.

(56) References Cited

U.S. PATENT DOCUMENTS 4,960,968 A * 10/1990 Kusakabe .......... B23K 11/0026
  219/117.1
6,403,917 B1 * 6/2002 Helldorfer ......... B23K 26/0604
  219/121.63

\* cited by examiner

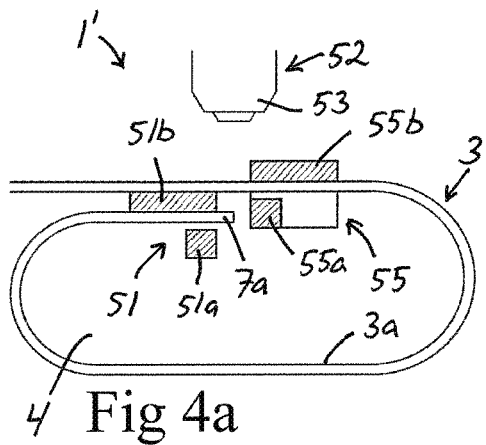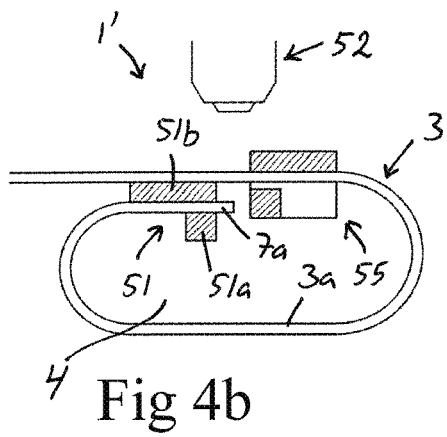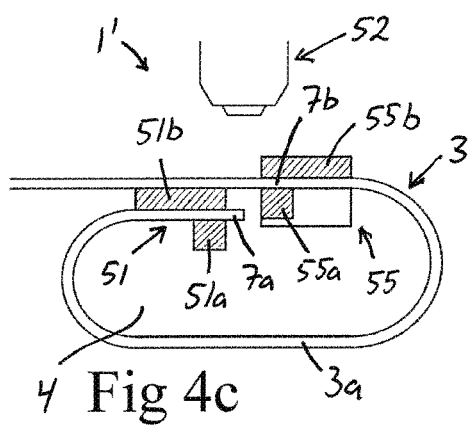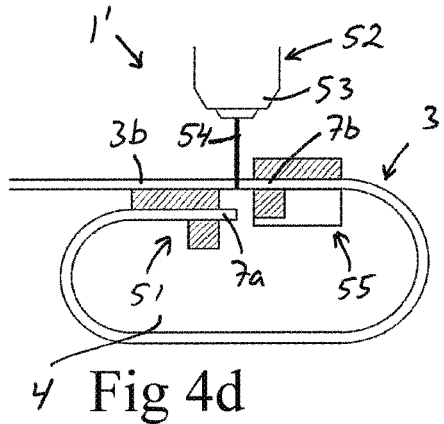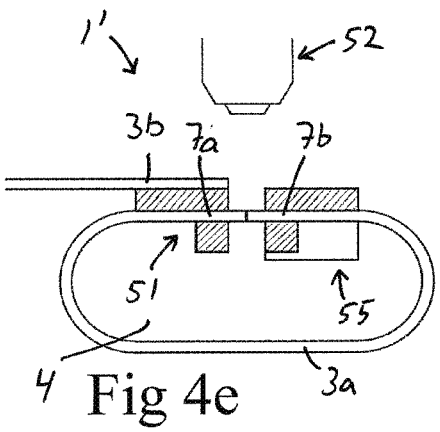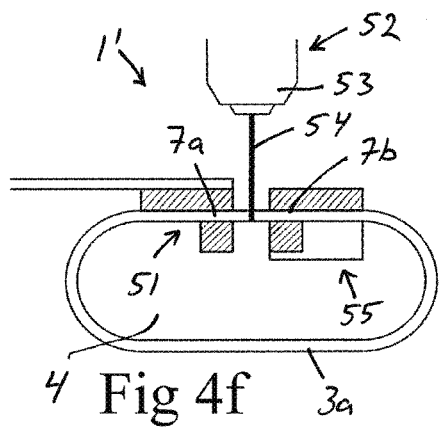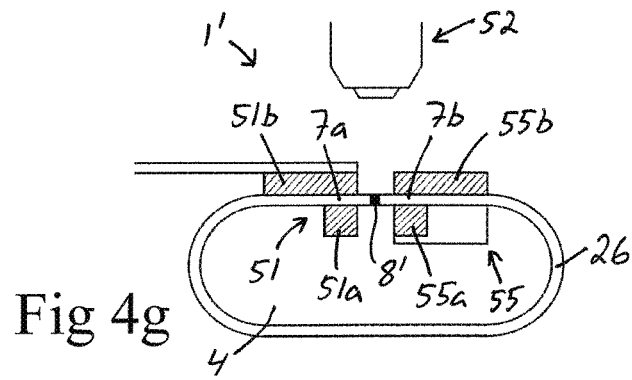

BINDING MACHINE AND METHOD FOR SECURING A PART OF A BINDING ELEMENT IN A LOOP AROUND ONE OR MORE OBJECTS

FIELD OF THE INVENTION AND PRIOR ART

The present invention relates to a binding machine according to the description herein. The invention also relates to a method according to the description herein for securing a part of an elongated binding element in a loop around one or more objects.

Automatic binding machines for applying a binding element in the form of a strap or wire in a loop around an object or a bundle of objects, drawing the binding element tightly around the object/bundle and thereafter joining overlapping sections of the binding element in order to secure the binding element around the object/bundle are known in many different configurations. U.S. Pat. No. 6,403,917 B1 discloses a binding machine where a laser welding device is used for forming a welded joint between overlapping sections of a binding element in the form of a strap to thereby secure the binding element in a loop around an object or a bundle of objects.

SUMMARY OF THE INVENTION

The object of the present invention is to achieve a new and favourable binding machine of the above-mentioned type.

According to the invention, this object is achieved by means of a binding machine having the features defined herein.

The binding machine of the present invention comprises:
- a feeding device for feeding an elongated binding element in the form of a wire or strap in a loop around a space configured for receiving one or more objects to be bound and subsequently retracting the binding element to draw it tightly around one or more objects received in said space;
- a gripping device for gripping and locking a first binding element section at the leading end of the binding element after the feeding of a part of the binding element in a loop around said space; and
- a laser welding device for forming a welded joint between said first binding element section and an adjoining second binding element section at the trailing end of the part of the binding element fed in a loop around said space to thereby secure this part of the binding element in a loop around said one or more objects.

According to the invention, the laser welding device is also used for cutting off the binding element at said trailing end by means of a laser beam emitted from a laser welding head of the laser welding device to thereby release the part of the binding element fed in a loop around said space from the remaining part of the binding element. Hereby, no separate cutting member is required for severing the binding element, which will reduce the complexity of the binding machine.

According to an embodiment of the invention, the binding machine comprises a splicing unit for splicing together a first binding element from a first binding element coil and a second binding element from another binding element coil, wherein the splicing unit comprises a further laser welding device for forming a welded joint between a trailing end of the first binding element and a leading end of the second binding element so as to thereby splice together the first and second binding elements by joining the trailing end of the first binding element to the leading end of the second binding element. Hereby, the binding element from each binding element coil used in the binding machine may be utilized in its full length, without having to throw away any section of the binding element at the trailing end thereof, which implies that the waste of binding element is minimized.

According to another embodiment of the invention, said further laser welding device of the splicing unit is configured to make a crosscut at the trailing end of the first binding element and at the leading end of the second binding element by means of a laser beam emitted from a laser welding head of the further laser welding device, before forming the welded joint between the trailing end of the first binding element and the leading end of the second binding element. Hereby, clean and straight edges suitable for the subsequent welding operation may be formed in an efficient and simple manner at the trailing end of the first binding element and the leading end of the second binding element.

Further advantageous features of the binding machine according to the present invention will appear from the following description.

The invention also relates to a method having the features defined herein.

Further advantageous features of the method according to the present invention will appear from the following description.

BRIEF DESCRIPTION OF THE DRAWINGS

With reference to the appended drawings, a specific description of preferred embodiments of the invention cited as examples follows below. In the drawings:

FIGS. 4a-4g are partly cut outline diagrams of parts included in a binding machine according to a second embodiment of the present invention, as seen at different stages during the process of securing a binding element in a loop around one or more objects.

DETAILED DESCRIPTION OF EMBODIMENTS OF THE INVENTION

Figure 1:
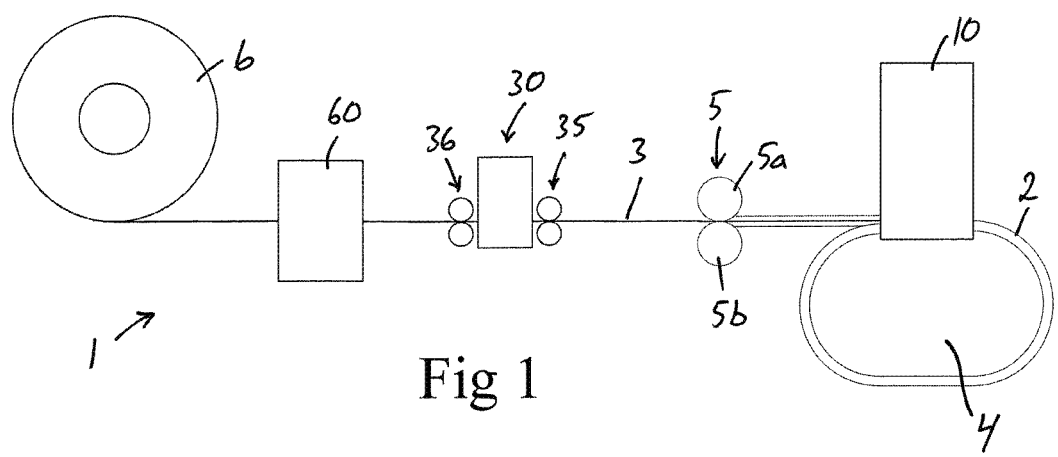
FIG. 1 is an outline diagram of a binding machine according to a first embodiment of the present invention.

Some of the parts included in a binding machine 1 according to a first embodiment of the present invention are very schematically illustrated in FIG. 1. The binding machine 1 comprises:
- a guide track 2 for guiding an elongated binding element 3 in the form of a wire or strap in a loop around a space 4 configured for receiving one or more objects to be bound;

a feeding device 5 for feeding the binding element 3 from a supply coil 6, into said guide track 2 and along the guide track in a loop around said space 4 and subsequently retracting the binding element 3 to draw it tightly around one or more objects received in said space 4;

an accumulator 60 for temporarily accumulating a part of the binding element 3 when the binding element is retracted by the feeding device 5 and then releasing the accumulated part of the binding element when the binding element thereafter is fed forwards by the feeding device 5; and a binding unit 10 for securing the binding element 3 around said one or more objects.

The guide track 2 may for instance have the form of a rail with a longitudinal opening facing said space 4.

In the illustrated embodiment, the feeding device 5 comprises two rotatable feed rollers 5a, 5b, which are located opposite each other and configured to be in contact with opposite sides of a part of the binding element 3 received in the nip between the feed rollers. At least one of the feed rollers 5a, 5b is rotatably driven by an actuator (not shown) in the form of a reversible drive motor in order to move the binding element 3 in its longitudinal direction. The drive motor is preferably an electric motor, but it could as an alternative be a hydraulic or pneumatic motor. The feeding device 5 may also comprise any other suitable type of actuator for feeding and retracting the binding element 3.

Some of the parts included in the above-mentioned binding unit 10 are very schematically illustrated in FIGS. 2a-2f. The binding unit 10 comprises:

a gripping device 11 for gripping and locking a first binding element section 7a (see FIGS. 2b and 2c) at the leading end of the binding element after the feeding of a part 3a of the binding element in a loop around said space 4; and a laser welding device 12 (see FIG. 2a) for forming a welded joint 8 (see FIGS. 2e and 2f) between said first binding element section 7a and an adjoining second binding element section 7b (see FIG. 2c) at the trailing end of the part 3a of the binding element fed in a loop around said space 4 to thereby secure this part 3a of the binding element in a loop around said one or more objects.

The laser welding device 12 comprises a laser welding head 12a, wherein said welded joint 8 is formed by means of a laser beam 14 (see FIG. 2d) emitted from the laser welding head.

The laser welding device 12 is also configured to cut off the binding element 3 at said trailing end by means of a laser beam 14 (see FIG. 2e) emitted from the laser welding head 12a to thereby release the part 3a of the binding element fed in a loop around said space 4 from the remaining part 3b of the binding element.

The laser welding head 12a may comprise one or more computer-controlled scanning mirrors for controlling the direction and movement of the laser beam 14 emitted from the laser welding head. As an alternative, the direction and movement of the laser beam 14 may be controlled by computer-controlled movements of the entire laser welding head 12a. The laser welding head 12a is provided with a focusing lens 13, through which the laser beam 14 leaves the laser welding head.

The laser welding device 12 further comprises a laser source 12b for generating the laser power required for producing the laser beam 14 used for forming the welded joint 8 between the first and second binding element sections 7a, 7b and for cutting off the binding element 3. The laser source 12b can be of any type commonly used for welding. In the illustrated example, the laser source 12b is connected to the laser welding head 12a via an optical fibre cable 12c, which is configured to guide the laser power generated by the laser source 12b to the laser welding head 12a.

In the embodiment illustrated in FIGS. 2a-2f, the laser welding device 12 is configured to form said welded joint 8 between said first and second binding element sections 7a, 7b as a lap joint with the second binding element section 7b overlapping the first binding element section 7a. In this case, the laser welding device 12 is preferably configured to form the welded joint 8 between the first and second binding element sections 7a, 7b in a first step and thereafter cut off the binding element 3 at said trailing end in a subsequent second step.

The binding unit 10 illustrated in FIGS. 2a-2f comprises a squeezing device 15 for squeezing the second binding element section 7b against the first binding element section 7a with the second binding element section 7b overlapping the first binding element section 7a, wherein the squeezing device 15 is configured to keep the second binding element section 7b squeezed against the first binding element section 7a during the moment when the welded joint 8 between the first and second binding element sections 7a, 7b is formed by the laser welding device 12. In the illustrated example, the binding unit 10 comprises a support member 16 for supporting the first binding element section 7a, and the squeezing device 15 comprises a squeezing member 17 which is configured to co-operate with the support member 16 and which is moveably mounted to a housing 18 of the binding unit 10. The first and second binding element sections 7a, 7b are receivable in a space between the squeezing member 17 and the support member 16 and the squeezing member 17 is moveable in relation to the support member 16 between a retracted first position (see FIGS. 2a-2c and 2f), in which the squeezing member 17 is retracted from the support member 16, and an advanced second position (see FIGS. 2d and 2e), in which the squeezing member 17 is pressed against the support member 16 in order to squeeze together the first and second binding element sections 7a, 7b. The squeezing member 17 is provided with a passage 19, through which a laser beam 14 from the laser welding head 12a of the laser welding device 12 may be directed towards an area on the second binding element section 7b when the squeezing member 17 is in said second position and keeps the first and second binding element sections 7a, 7b squeezed together between the squeezing member 17 and the support member 16. The squeezing member 17 is moveable between said first and second positions by means of an actuator (not shown), which may be electrically, pneumatically or hydraulically driven.

In the binding unit 10 illustrated in FIGS. 2a-2f, the gripping device 11 comprises a clamping member 20 which is moveably mounted to the housing 18. The clamping member 20 is moveable in relation to the support member 16 between a retracted position (see FIGS. 2a, 2b and 2f), in which the clamping member 20 is retracted from the support member 16 and allows the first binding element section 7a to pass between the clamping member 20 and the support member 16, and an advanced position (see FIGS. 2c-2e), in which the clamping member 20 is pressed against the support member 16 in order to grip and lock the first binding element section 7a between the clamping member 20 and the support member 16. The clamping member 20 is moveable between said retracted and advanced positions by means of an actuator (not shown), which may be electrically, pneumatically or hydraulically driven.

Figure 3A:
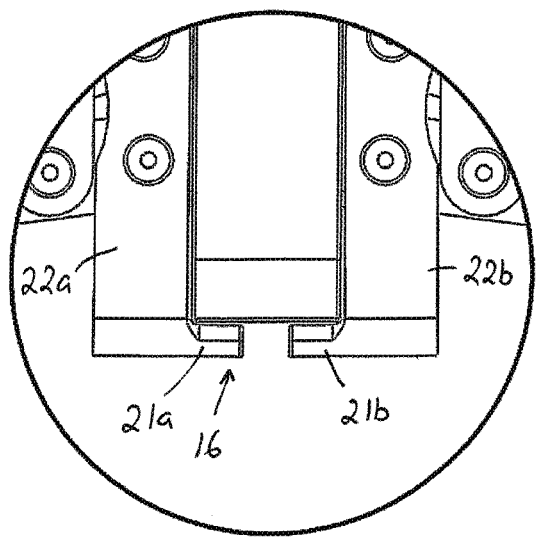
FIG. 3a is a schematic frontal view of a support member included in the binding machine of FIG. 1, as seen with two jaws of the support member in an advanced supporting position.
Figure 3B:
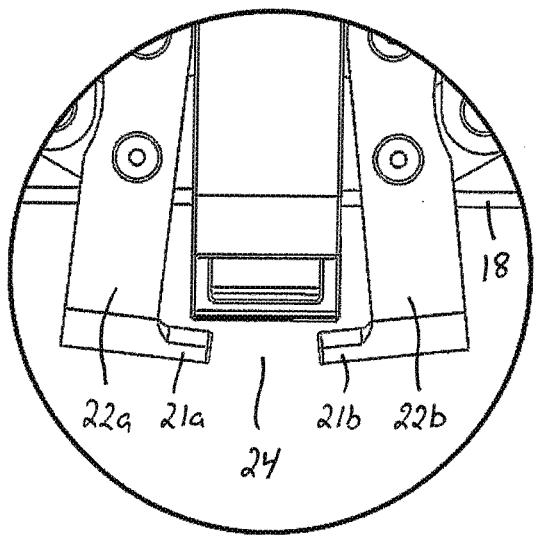
FIG. 3b is a schematic frontal view of the support member, as seen with the jaws of the support member in a retracted releasing position.

As illustrated in FIGS. 3a and 3b, the support member 16 may comprise first and second support jaws 21a, 21b located opposite each other, wherein the support jaws 21a, 21b are moveable in relation to each other between an advanced supporting position (see FIG. 3a), in which the support jaws 21a, 21b form a support for the first binding element section 7a, and a retracted releasing position (see FIG. 3b), in which the support jaws 21a, 21b are retracted from each other in order to allow the first and second binding element sections 7a, 7b, after having been joined to each other, to pass through the gap 24 between the support jaws 21a, 21b. In the illustrated example, each support jaw 21a, 21b is fixed to a pivot arm 22a, 22b, which in its turn is pivotally mounted to the housing 18 of the binding unit 10. Thus, in this case, the support jaws 21a, 21b are pivotable between the supporting and releasing positions. As an alternative, the support jaws could be linearly moveable between the supporting and releasing positions. The support jaws 21a, 21b are moveable between the supporting and releasing positions by means of an actuator (not shown), which may be electrically, pneumatically or hydraulically driven.

The gripping device 11 and the squeezing device 15 may of course also have any other suitable design in addition to the designs illustrated in FIGS. 2a-2f.

The binding machine 1 may have the form of a strapping machine, wherein the binding element 3 is a strap of metallic or plastic material. As an alternative, the binding machine 1 may have the form of a wire binding machine, wherein the binding element 3 is a wire of metallic or plastic material.

An operating sequence for securing a binding element 3 in a loop around an object 9 by means of the above-described binding machine 1 will now be described with reference to FIGS. 2a-2f.

Figure 2A:
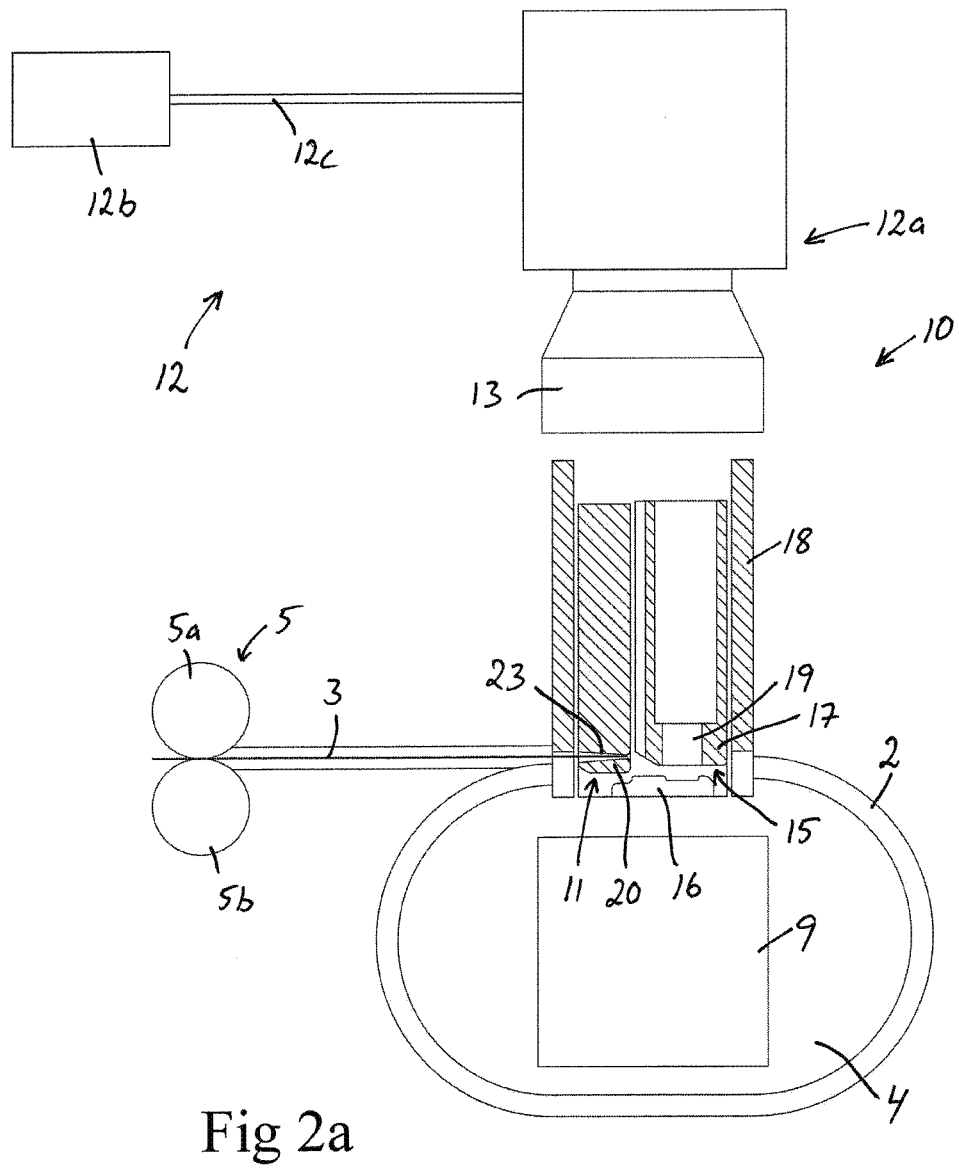
FIGS. 2a-2f are partly cut outline diagrams of parts included in the binding machine of FIG. 1, as seen at different stages during the process of securing a binding element in a loop around an object.
Figure 2B:
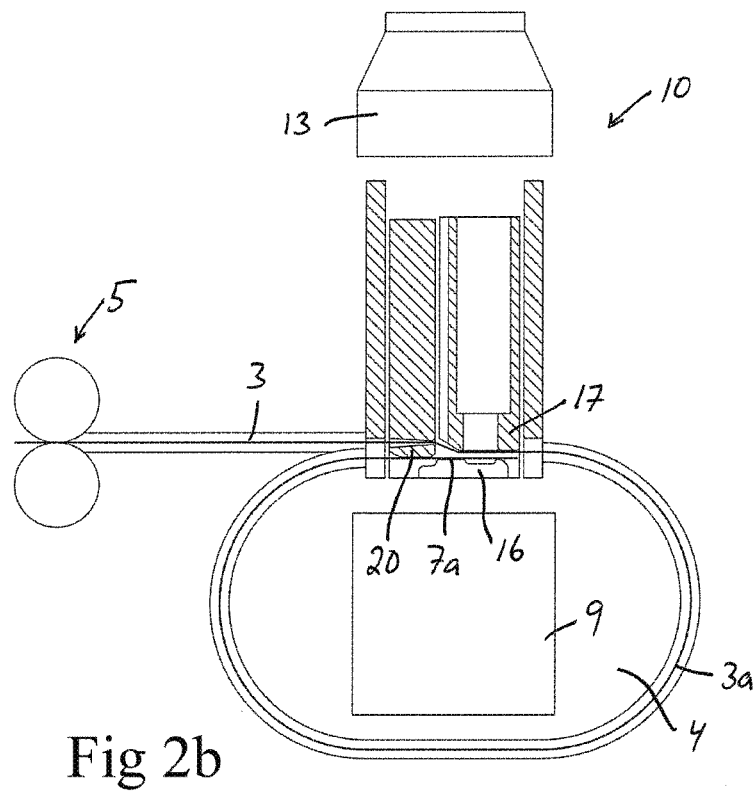
Figure 2C:
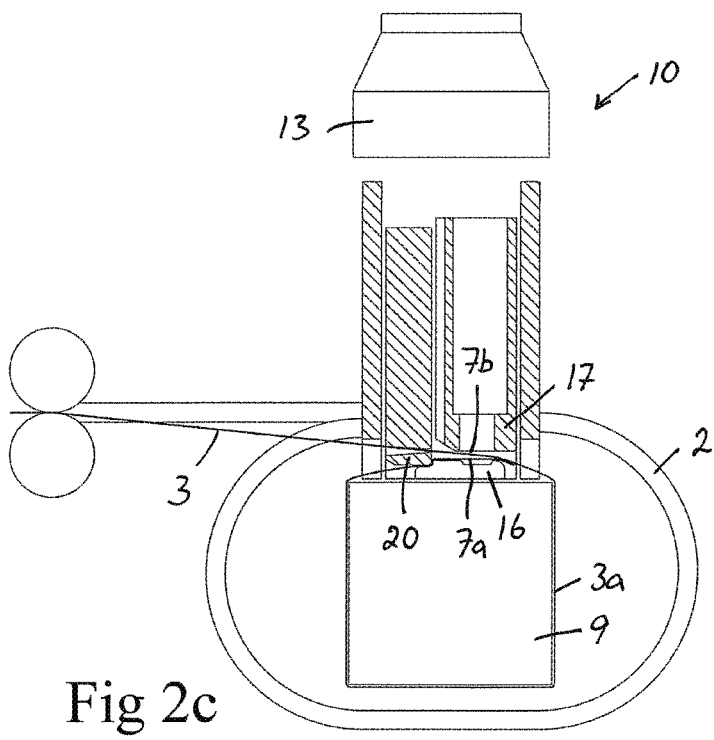
Figure 2D:
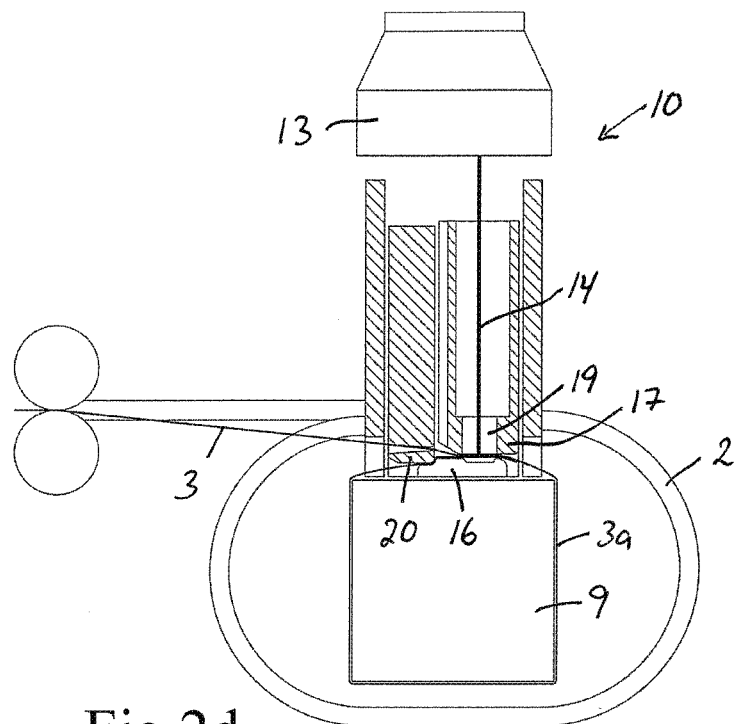
Figure 2E:
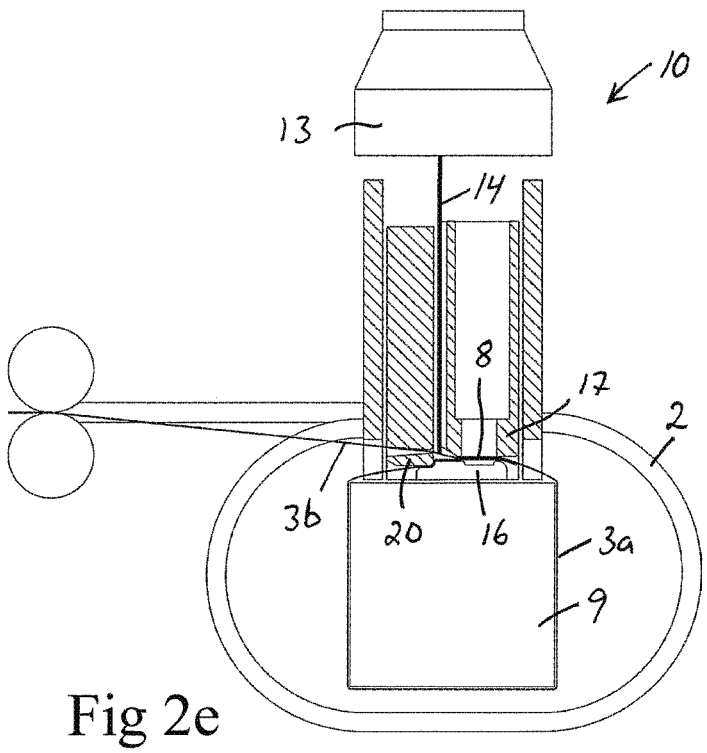
Figure 2F:
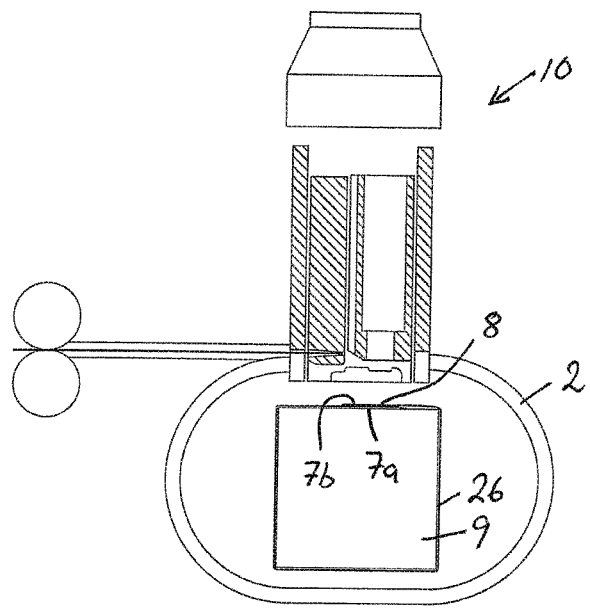

In a first step, a motor of the feeding device 5 is operated in a first direction in order to feed the binding element 3 forwards from the supply coil 6, through a passage 23 (see FIG. 2a) in the clamping member 20 and into the guide track 2. During the feeding of the binding element 3, the clamping member 20 is in its retracted position, the squeezing member 17 in its retracted first position and the support jaws 21a, 21b in the supporting position. The binding element 3 is fed forwards in the guide track 2 in a loop around the object 9. The leading end of the binding element 3 will then leave the guide track 2 and pass through the gap between the clamping member 20 and the support member 16 (see FIG. 2b), whereupon the leading end of the binding element 3 actuates a stop member (not shown) and the motor of the feeding device 5 is stopped. The clamping member 20 is then moved to its advanced position in order to grip the first binding element section 7a at the leading end of the binding element 3 to thereby lock the first binding element section 7a between the clamping member 20 and the support member 16. Thereafter, the motor of the feeding device 5 is reversed in order to pull the binding element 3 backwards and thereby tighten the binding element 3 around the object 9, as illustrated in FIG. 2c. When the binding element 3 has been drawn tightly around the object 9, the motor of the feeding device 5 is stopped and the squeezing member 17 is moved to its advanced second position in order to squeeze together the first and second binding element sections 7a, 7b between the squeezing member 17 and the support member 16 (see FIG. 2d). The laser welding device 12 is then operated to focus a laser beam 14 onto the mutually overlapping binding element sections 7a, 7b in order to form a welded joint 8 between the binding element sections 7a, 7b and thereby secure the binding element in a loop around the object 9. Thereafter, the laser welding device 12 is operated to focus a laser beam 14 onto a part of the binding element 3 located between the clamping member 20 and the squeezing member 17, as illustrated in FIG. 2e, in order to cut off the binding element 3 and thereby release the part 3a of the binding element secured in a loop around the object 9 from the remaining part 3b of the binding element. Finally, the clamping member 20 is returned to its retracted position and the squeezing member 17 to its retracted first position, whereupon the support jaws 21a, 21b are moved to the releasing position in order to release the binding element loop 26 from the binding unit 10.

Figure 5A:
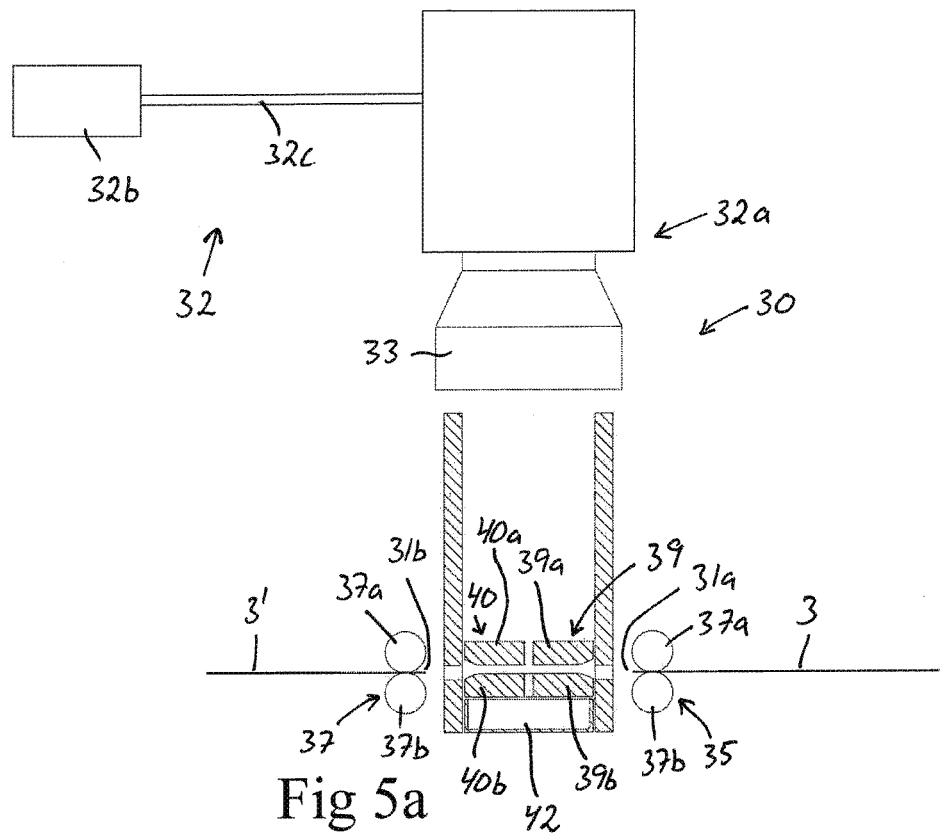
FIGS. 5a-5g are partly cut outline diagrams of a splicing unit included in the binding machine of FIG. 1, as seen at different stages during the process of splicing together a first binding element from a first binding element coil and a second binding element from another binding element coil.

The binding machine 1 illustrated in FIG. 1 also comprises a splicing unit 30 for splicing together a first binding element 3 from a first binding element coil 6 and a second binding element 3' (see FIGS. 5a-5g) from another binding element coil, when the first binding element 3 has been completely uncoiled from the first binding element coil and the uncoiling of a new binding element 3' from a new binding element coil has started. The splicing unit 30 comprises a laser welding device 32 (see FIG. 5a) for forming a welded joint 38 (see FIG. 5g) between a trailing end 31a of the first binding element 3 and a leading end 31b of the second binding element 3' so as to thereby splice together the first and second binding elements 3, 3'. The laser welding device 32 comprises a laser welding head 32a, wherein said welded joint 38 is formed by means of a laser beam 34 emitted from the laser welding head.

The welded joint 38 is preferably formed as a butt joint, with an outer edge at the trailing end 31a of the first binding element 3 in contact with an opposite outer edge at the leading end 31b of the second binding element 3'. In this case, the laser welding device 32 is with advantage configured to make a crosscut at the trailing end 31a of the first binding element 3 and at the leading end 31b of the second binding element 3' by means of a laser beam 34 emitted from the laser welding head 32a of the laser welding device 32, before forming the welded joint 38.

The laser welding head 32a may comprise one or more computer-controlled scanning mirrors for controlling the direction and movement of the laser beam 34 emitted from the laser welding head. As an alternative, the direction and movement of the laser beam 34 may be controlled by computer-controlled movements of the entire laser welding head 32a. The laser welding head 32a is provided with a focusing lens 33, through which the laser beam 34 leaves the laser welding head.

The laser welding device 32 further comprises a laser source 32b for generating the laser power required for producing the laser beam 34 used for forming the welded joint 38 between the first and second binding elements 3, 3' and for making the crosscut at the trailing end 31a of the first binding element 3 and at the leading end 31b of the second binding element 3'. The laser source 32b can be of any type commonly used for welding. In the illustrated example, the laser source 32b is connected to the laser welding head 32a via an optical fibre cable 32c, which is configured to guide the laser power generated by the laser source 32b to the laser welding head 32a.

In the embodiment illustrated in FIGS. 5a-5g, the splicing unit 30 comprises a first feeding device 35 capable of feeding the trailing end 31a of the first binding element 3 rearwards and a second feeding device 36 capable of feeding the leading end 31b of the second binding element 3' forwards. Each feeding device 35, 36 may comprise two rotatable feed rollers 37a, 37b, which are located opposite each other and configured to be in contact with opposite sides of a part of the binding element 3, 3' received in the nip between the feed rollers. At least one of the feed rollers 37a, 37b of each feeding device 35, 36 is rotatably driven by a drive motor (not shown) in order to move the binding element 3, 3' in its longitudinal direction. The drive motor is preferably an electric motor, but it could as an alternative be a pneumatic or hydraulic motor.

In the embodiment illustrated in FIGS. 5a-5g, the splicing unit 30 further comprises a first gripping device 39 for gripping and locking the trailing end 31a of the first binding element 3 and a second gripping device 40 for gripping and locking the leading end 31b of the second binding element 3'. In the illustrated example, the first gripping device 39 comprises a clamping member 39a and an associated base member 39b, wherein the clamping member 39a is moveable in relation to the base member 39b between a retracted releasing position (see FIGS. 5a, 5b, 5d, 5e and 5g), in which the trailing end 31a of the first binding element 3 is free to pass through an interspace between the clamping member 39a and the base member 39b, and an advanced clamping position (see FIGS. 5c and 5f), in which the trailing end 31a of the first binding element 3 is clamped between the clamping member 39a and the base member 39b. In the illustrated example, also the second gripping device 40 comprises a clamping member 40a and an associated base member 40b, wherein the clamping member 40a is moveable in relation to the base member 40b between a retracted releasing position (see FIGS. 5a, 5b, 5d, 5e and 5g), in which the leading end 31b of the second binding element 3' is free to pass through an interspace between the clamping member 40a and the base member 40b, and an advanced clamping position (see FIGS. 5c and 5f), in which the leading end 31b of the second binding element 3' is clamped between the clamping member 40a and the base member 40b. The gripping devices 39, 40 may of course also be designed in any other suitable manner.

An operating sequence for splicing together two binding elements 3, 3' by means of the above-described splicing unit 30 will now be described with reference to FIGS. 5a-5g.

Figures 5B, 5C:
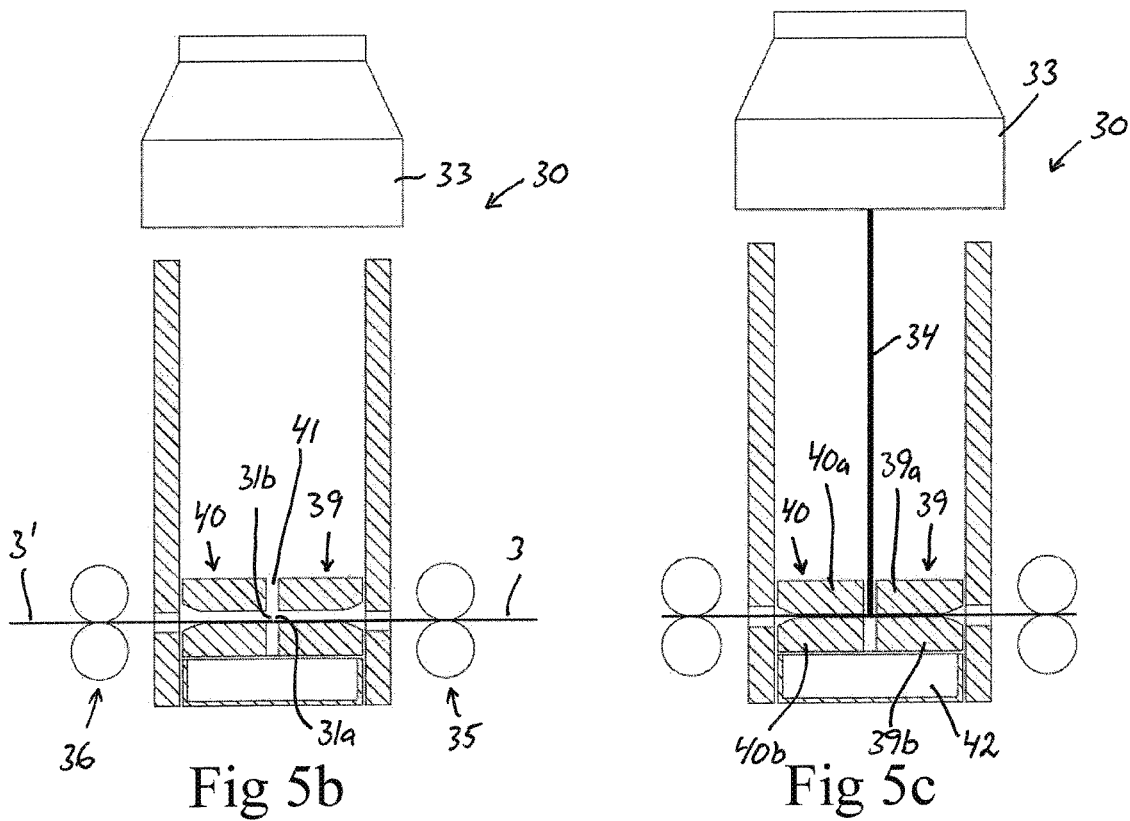
Figure 5D:
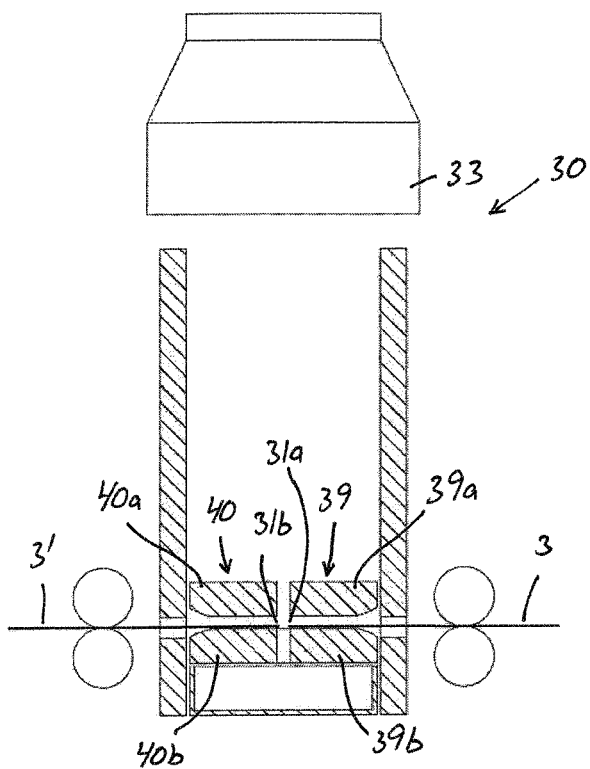
Figure 5E:
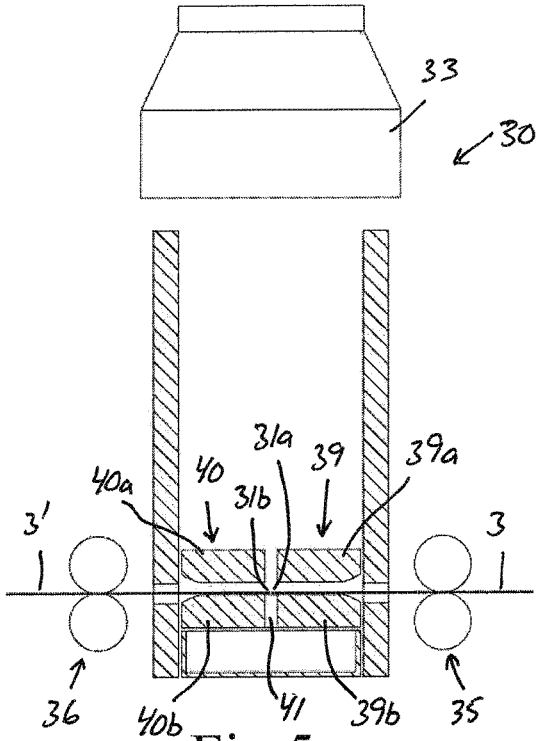
Figure 5F:
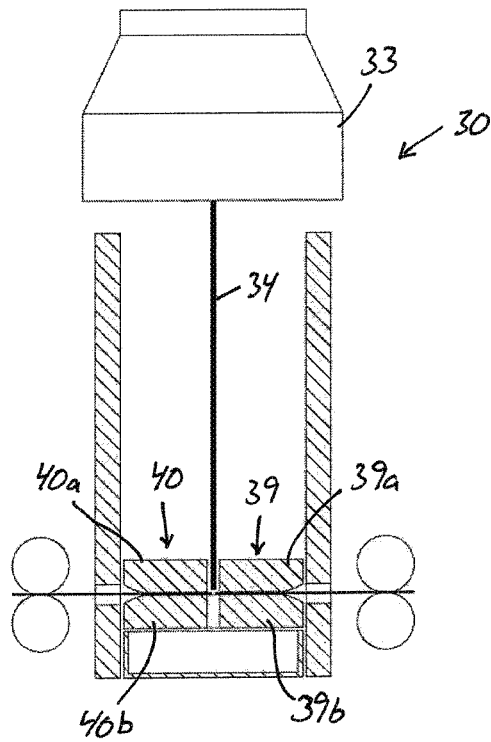
Figure 5G:
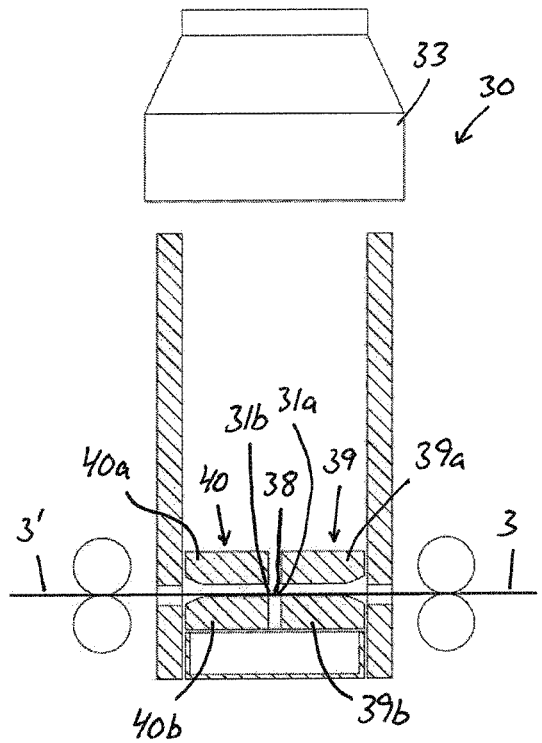

In a first step, the motors of the first and second feeding devices 35, 36 are operated in order to feed the trailing end 31a of the first binding element 3 rearwards and the leading end 31b of the second binding element 3' forwards so that these ends 31a, 31b meet each other at a gap 41 between the first and second gripping devices 39, 40, as illustrated in FIG. 5b. During the feeding of the binding elements 3, 3', each clamping member 39a, 40a is in its releasing position so as to allow the trailing end 31a of the first binding element 3 to be moved into an interspace between the clamping member 39a and base member 39b of the first gripping device 39 and the leading end 31b of the second binding element 3' to be moved into an interspace between the clamping member 40a and base member 40b of the second gripping device 40. The clamping member 39a, 40a of each gripping device 39, 40 is then moved to its clamping position in order to grip and lock the trailing end 31a of the first binding element 3 and the leading end 31b of the second binding element 3', as illustrated in FIG. 5c, whereupon the laser welding device 32 is operated to focus a laser beam 34 onto said ends 31a, 31b in order to make a crosscut at the ends 31a, 31b and thereby prepare them for the subsequent welding. The material released from the binding elements 3, 3' by this crosscutting is allowed to fall down into a collecting receptacle 42 below the gripping devices 39, 40. In the next step, the clamping member 39a, 40a of each gripping device 39, 40 is moved to its releasing position (see FIG. 5d), whereupon the first and second feeding devices 35, 36 are operated in order to feed the trailing end 31a of the first binding element 3 rearwards and the leading end 31b of the second binding element 3' forwards so that these ends 31a, 31b again meet each other at the gap 41 between the first and second gripping devices 39, 40, as illustrated in FIG. 5e. The clamping member 39a, 40a of each gripping device 39, 40 is then moved to its clamping position in order to grip and lock the trailing end 31a of the first binding element 3 and the leading end 31b of the second binding element 3', as illustrated in FIG. 5f, whereupon the laser welding device 32 is operated to focus a laser beam 34 onto said ends 31a, 31b in order to form a welded joint 38 between the ends 31a, 31b and thereby splice together the first and second binding elements 3, 3'. Finally, each clamping member 39a, 40a is returned to its releasing position, as illustrated in FIG. 5g.

A splicing unit 30 of the type described above may of course be combined with a binding unit 10 of any desired type.

Some of the parts included in a binding machine 1' according to a second embodiment of the invention are very schematically illustrated in FIGS. 4a-4g. This binding machine 1' comprises:

a guide track (not shown) for guiding an elongated binding element 3 in the form of a wire or strap in a loop around a space 4 configured for receiving one or more objects to be bound;
  a feeding device (not shown) for feeding the binding element 3 into said guide track and along the guide track in a loop around said space 4 and subsequently retracting the binding element 3 to draw it tightly around one or more objects received in said space 4;
  a first gripping device 51 for gripping and locking a first binding element section 7a at the leading end of the binding element after the feeding of a part 3a of the binding element in a loop around said space 4; and
  a laser welding device 52 for forming a welded joint 8' (see FIG. 4g) between said first binding element section 7a and an adjoining second binding element section 7b at the trailing end of the part 3a of the binding element fed in a loop around said space 4 to thereby secure this part 3a of the binding element in a loop around said one or more objects.

The laser welding device 52 comprises a laser welding head 53, wherein said welded joint 8' is formed by means of a laser beam 54 emitted from the laser welding head.

The laser welding device 52 is also configured to cut off the binding element 3 at said trailing end by means of a laser beam 54 emitted from the laser welding head 53 to thereby release the part 3a of the binding element fed in a loop around said space 4 from the remaining part 3b of the binding element.

In the embodiment illustrated in FIGS. 4a-4g, the binding machine 1' also comprises a second gripping device 55 for gripping said second binding element section 7b when the binding element 3 has been draw tightly around said one or more objects. The first and second gripping devices 51, 55 are moveable in relation to each other to thereby allow said first and second binding element sections 7a, 7b to be mutually moved from a cutting position (see FIGS. 4c and 4d), in which the first and second binding element sections 7a, 7b are at a distance from each other, to a welding position (see FIGS. 4e and 4f), in which the first and second binding element sections 7a, 7b are in contact with each other. The laser welding device 52 is configured to cut off the binding element 3 at said trailing end when the first and second binding element sections 7a, 7b are held in said cutting position by the first and second gripping devices 51, 55, and to form the welded joint 8' when the first and second binding element sections 7a, 7b are held in said welding position by the first and second gripping devices 51, 55.

In the embodiment illustrated in FIGS. 4a-4g, the first gripping device 51 is mounted so as to be stationary in relation to a frame (not shown) of the binding machine 1', whereas the second gripping device 55 is moveably mounted to said frame so as to be moveable in relation to the first gripping device 51 and thereby allow the first and second binding element sections 7a, 7b to be positioned in said welding position by a movement of the second binding element section 7b towards the first binding element section 7a. As an alternative, the second gripping device 55 could be mounted so as to be stationary in relation to the frame of the binding machine 1' and the first gripping device 51 moveably mounted to said frame so as to be moveable in relation to the second gripping device 55 and thereby allow the first and second binding element sections 7a, 7b to be positioned in said welding position by a movement of the first binding element section 7a towards the second binding element section 7b. As a further alternative, the first and second gripping devices 51, 55 could both be moveably mounted to the frame of the binding machine 1' and thereby allow the first and second binding element sections 7a, 7b to be positioned in said welding position by a simultaneous movement of the first and second binding element sections 7a, 7b towards each other.

In the illustrated example, the first gripping device 51 comprises a clamping member 51a and an associated base member 51b, wherein the clamping member 51a is moveable in relation to the base member 51b between a releasing position (see FIG. 4a), in which the binding element 3 is free to pass through an interspace between the clamping member 51a and the base member 51b, and a clamping position (see FIGS. 4b-4g), in which the first binding element section 7a is clamped between the clamping member 51a and the base member 51b. In the illustrated example, also the second gripping device 55 comprises a clamping member 55a and an associated base member 55b, wherein the clamping member 55a is moveable in relation to the base member 55b between a releasing position (see FIGS. 4a and 4b), in which the binding element 3 is free to pass through an interspace between the clamping member 55a and the base member 55b, and a clamping position (see FIGS. 4c-4g), in which the second binding element section 7b is clamped between the clamping member 55a and the base member 55b. The gripping devices 51, 55 may of course also be designed in any other suitable manner.

In the embodiment illustrated in FIGS. 4a-4g, the laser welding device 52 is configured to cut off the binding element 3 at said trailing end in a first step (see FIG. 4d) and thereafter form the welded joint 8' between the first and second binding element sections 7a, 7b in a subsequent second step (see FIG. 4f). In this case, the welded joint 8' between the first and second binding element sections 7a, 7b is formed as a butt joint, with an outer edge of the second binding element section 7b in contact with an opposite outer edge of the first binding element section 7a.

The binding machine 1' may have the form of a strapping machine, wherein the binding element 3 is a strap of metallic or plastic material. As an alternative, the binding machine 1' may have the form of a wire binding machine, wherein the binding element 3 is a wire of metallic or plastic material.

An operating sequence for securing a binding element 3 in a loop around an object or a bundle of objects (not shown) by means of the above-described binding machine 1' will now be described with reference to FIGS. 4a-4g.

In a first step, a motor of the feeding device is operated in a first direction in order to feed a binding element 3 forwards from a supply coil, through the second gripping device 55 and into the above-mentioned guide track. The binding element 3 is fed forwards in the guide track in a loop around the space 4. The leading end of the binding element 3 will then leave the guide track and pass through the first gripping device 51 (see FIG. 4a), whereupon the leading end of the binding element 3 actuates a stop member and the motor of the feeding device is stopped. The clamping member 51a of the first gripping device 51 is then displaced to grip the first binding element section 7a at the leading end of the binding element 3 to thereby lock the first binding element section 7a to the first gripping device 51. An object or a bundle of objects is feed into the space 4, for instance by means of a conveyor (not shown). Thereafter, the motor of the feeding device is reversed in order to pull the binding element 3 backwards and thereby tighten the binding element 3 around the object/objects, as illustrated in FIG. 4b. When the binding element 3 has been drawn tightly around the object/objects, the motor of the feeding device is stopped and the clamping member 55a of the second gripping device 55 is displaced to grip the second binding element section 7b to thereby lock the second binding element section 7b to the second gripping device 55 (see FIG. 4c). The laser welding device 52 is then operated to focus a laser beam 54 onto the second binding element section 7b (see FIG. 4d) in order to cut off the binding element 3 and thereby release the part 3a of the binding element fed in a loop around said space 4 from the remaining part 3b of the binding element. Thereafter, the motor of the feeding device is actuated in order to pull said remaining part 3b of the binding element a short distance backwards from the position illustrated in FIG. 4d to the position illustrated in FIG. 4e, whereupon the second gripping device 55 is moved from the position illustrated in FIG. 4d to the position illustrated in FIG. 4e so as to thereby bring the outer end of the second binding element section 7b into contact with the outer end of the first binding element section 7a. The laser welding device 52 is then operated to focus a laser beam 54 onto the joint between the first and second binding element sections 7a, 7b (see FIG. 4f) in order to form a welded joint 8' between the first and second binding element sections 7a, 7b (see FIG. 4g) and thereby secure the binding element in a loop around the object/objects to be bound. The clamping members 51a, 55a are then moved away from the respective base member 51b, 55b to thereby allow the binding element loop 26 to be released from the gripping devices 51, 55.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:
1. A binding machine comprising:
  a feeding device (5) for feeding an elongated binding element (3) in the form of a wire or strap in a loop around a space (4) configured for receiving one or more objects (9) to be bound and subsequently retracting the binding element (3) to draw it tightly around one or more objects (9) received in said space (4);
  a gripping device (11; 51) for gripping and locking a first binding element section (7a) at a leading end of the binding element after the feeding of a part (3*a*) of the binding element in the loop around said space (4); and a laser welding device (12; 52) for forming a welded joint (8; 8') between said first binding element section (7*a*) and an adjoining second binding element section (7*b*) at a trailing end of the part (3*a*) of the binding element fed in the loop around said space (4) to thereby secure this part (3*a*) of the binding element in the loop around said one or more objects (9), wherein the laser welding device (12; 52) is configured to cut off the binding element (3) at said trailing end by a laser beam (14; 54) emitted from a laser welding head (12*a*; 53) of the laser welding device to thereby release the part (3*a*) of the binding element fed in the loop around said space (4) from a remaining part (3*b*) of the binding element.

2. The binding machine according to claim 1, wherein the laser welding device (12) is configured to form said welded joint (8) between said first and second binding element sections (7*a*, 7*b*) in a first step and thereafter cut off the binding element (3) at said trailing end in a subsequent second step.

3. The binding machine according to claim 1, wherein the binding machine (1) comprises a squeezing device (15) for squeezing the second binding element section (7*b*) against the first binding element section (7*a*) with the second binding element section (7*b*) overlapping the first binding element section (7*a*), and the squeezing device (15) is configured to keep the second binding element section (7*b*) squeezed against the first binding element section (7*a*) during the moment when the welded joint (8) between the first and second binding element sections (7*a*, 7*b*) is formed by the laser welding device (12).

4. The binding machine according to claim 3, wherein the binding machine (1) comprises a support member (16) for supporting the first binding element section (7*a*);

the squeezing device (15) comprises a squeezing member (17) which is configured to co-operate with the support member (16), the first and second binding element sections (7*a*, 7*b*) are receivable in a space between the squeezing member (17) and the support member (16) and the squeezing member (17) is moveable in relation to the support member (16) between a retracted first position, in which the squeezing member (17) is retracted from the support member (16), and an advanced second position, in which the squeezing member (17) is pressed against the support member (16) to squeeze together the first and second binding element sections (7*a*, 7*b*); and the squeezing member (17) is provided with a passage (19), through which a laser beam (14) from the laser welding head (12*a*) of the laser welding device (12) may be directed towards an area on the second binding element section (7*b*) when the squeezing member (17) is in said second position and keeps the first and second binding element sections (7*a*, 7*b*) squeezed together between the squeezing member (17) and the support member (16).

5. The binding machine according to claim 4, wherein the gripping device (11) comprises a clamping member (20) which is moveable in relation to said support member (16) between a retracted position, in which the clamping member (20) is retracted from the support member (16) and allows the first binding element section (7*a*) to pass between the clamping member (20) and the support member (16), and an advanced position, in which the clamping member (20) is pressed against the support member (16) to grip and lock the first binding element section (7*a*) between the clamping member (20) and the support member (16).

6. The binding machine according to claim 4, wherein said support member (16) comprises first and second support jaws (21*a*, 21*b*) located opposite each other, and the first and second support jaws (21*a*, 21*b*) are moveable in relation to each other between an advanced supporting position, in which the first and second support jaws (21*a*, 21*b*) form a support for the first binding element section (7*a*), and a retracted releasing position, in which first and second support jaws (21*a*, 21*b*) are retracted from each other to allow the first and second binding element sections (7*a*, 7*b*) to pass through a gap (24) between first and second support jaws (21*a*, 21*b*).

7. The binding machine according to claim 1, wherein the laser welding device (52) is configured to cut off the binding element (3) at said trailing end in a first step and thereafter form said welded joint (8') between said first and second binding element sections (7*a*, 7*b*) in a subsequent second step.

8. The binding machine according to claim 7, wherein said gripping device (51) constitutes a first gripping device of the binding machine (1'), the binding machine (1') further comprises a second gripping device (55) for gripping said second binding element section (7*b*) when the binding element (3) has been draw tightly around said one or more objects, the first and second gripping devices (51, 55) being moveable in relation to each other to thereby allow said first and second binding element sections (7*a*, 7*b*) to be mutually moved from a cutting position, in which the first and second binding element sections (7*a*, 7*b*) are at a distance from each other, to a welding position, in which the first and second binding element sections (7*a*, 7*b*) are in contact with each other;

the laser welding device (52) is configured to cut off the binding element (3) at said trailing end when the first and second binding element sections (7*a*, 7*b*) are held in said cutting position by the first and second gripping devices (51, 55); and the laser welding device (52) is configured to form said welded joint (8') between the first and second binding element sections (7*a*, 7*b*) when the first and second binding element sections (7*a*, 7*b*) are held in said welding position by the first and second gripping devices (51, 55).

9. The binding machine according to claim 1, wherein the binding machine (1; 1') is a strapping machine, and the binding element (3) is a strap of metallic or plastic material.

10. The binding machine according to claim 1, wherein the binding machine (1; 1') is a wire binding machine, and the binding element (3) is a wire of metallic material.

11. The binding machine according to claim 1, wherein the binding machine (1) comprises a splicing unit (30) for splicing together a first binding element (3) from a first binding element coil and a second binding element (3') from another binding element coil, and the splicing unit (30) comprises a further laser welding device (32) for forming a welded joint (38) between a trailing end (31*a*) of the first binding element (3) and a leading end (31*b*) of the second binding element (3') to thereby splice together the first and second binding elements (3, 3') by joining the trailing end (31*a*) of the first binding element (3) to the leading end (31*b*) of the second binding element (3').

12. The binding machine according to claim 11, wherein said further laser welding device (32) of the splicing unit (30) is configured to make a crosscut at the trailing end (31*a*)

of the first binding element (3) and at the leading end (31b) of the second binding element (3') by a laser beam (34) emitted from a laser welding head (32a) of the further laser welding device, before forming the welded joint (38) between the trailing end (31a) of the first binding element (3) and the leading end (31b) of the second binding element (3').

13. The binding machine according to claim 1, wherein the binding machine comprises a guide track (2) for guiding the binding element (3) in the loop around said space (4), and the feeding device (5) is configured to feed the binding element (3) into said guide track (2) and along the guide track in a loop around said space (4).

14. A method for securing a part (3a) of an elongated binding element (3) in a loop around one or more objects, wherein the method comprises the steps of:

positioning said one or more objects in an object receiving space (4) of a binding machine (1; 1');

feeding the binding element (3) in the loop around said space (4);

gripping and locking a first binding element section (7a) at a leading end of the binding element after the feeding of a part (3a) of the binding element in the loop around said space (4);

retracting the binding element (3) to draw it tightly around said one or more objects; and forming, by a laser welding device (12; 52) included in the binding machine (1; 1'), a welded joint (8; 8') between said first binding element section (7a) and an adjoining second binding element section (7b) at a trailing end of the part (3a) of the binding element fed in the loop around said space (4) to thereby secure this part (3a) of the binding element in the loop around said one or more objects, wherein the binding element (3) is cut off at a said trailing end by a laser beam (14; 54) emitted from a laser welding head (12a; 53) of the laser welding device (12; 52) to thereby release the part (3a) of the binding element fed in the loop around said space (4) from the remaining part (3b) of the binding element.

15. The method according to claim 14, wherein said welded joint (8) between said first and second binding element sections (7a, 7b) is formed as a lap joint by the laser welding device (12) in a first step, whereupon the binding element (3) is cut off at said trailing end by the laser welding device (12) in a subsequent second step.

16. The method according to claim 14, wherein the binding element (3) is cut off at said trailing end by the laser welding device (52) in a first step, whereupon said welded joint (8') between said first and second binding element sections (7a, 7b) is formed as a butt joint by the laser welding device (12; 52) in a subsequent second step.

* * * * *